United States Patent [19]

Rule et al.

[11] Patent Number: 5,026,824
[45] Date of Patent: * Jun. 25, 1991

[54] COPOLY(PHENYLENE SULFIDE)

[75] Inventors: Mark Rule, Kingsport; Jerry S. Fauver, Blountville; David R. Fagerburg, Kingsport; Paul B. Lawrence, Blountville; Joseph J. Watkins, Kingsport, all of Tenn.

[73] Assignee: Eastman Kodak Company, Rochester, N.Y.

[*] Notice: The portion of the term of this patent subsequent to Dec. 20, 2005 has been disclaimed.

[21] Appl. No.: 522,495

[22] Filed: May 14, 1990

Related U.S. Application Data

[63] Continuation of Ser. No. 382,457, Jul. 20, 1989, abandoned, which is a continuation-in-part of Ser. No. 232,969, Aug. 17, 1988, abandoned.

[51] Int. Cl.$^5$ .............................................. C08G 75/14
[52] U.S. Cl. ...................................... 528/389; 528/388
[58] Field of Search ................. 528/388, 389; 525/537

[56] References Cited

U.S. PATENT DOCUMENTS

| | | | |
|---|---|---|---|
| 3,919,177 | 11/1975 | Campbell | 528/388 |
| 4,451,640 | 5/1984 | Shiki et al. | 528/388 |
| 4,605,732 | 8/1986 | Heitz et al. | 528/388 |
| 4,698,415 | 10/1987 | Sinclair et al. | 528/388 |
| 4,748,169 | 5/1988 | Izutsu et al. | 525/537 |
| 4,786,713 | 11/1988 | Rule et al. | 528/389 |
| 4,792,600 | 12/1988 | Rule et al. | 528/389 |
| 4,826,956 | 5/1989 | Fagerburg et al. | 528/389 |
| 4,840,986 | 6/1989 | Inoue et al. | 528/388 |

FOREIGN PATENT DOCUMENTS 3714583 11/1987 Fed. Rep. of Germany .

*Primary Examiner*—Melvyn I. Marquis
*Assistant Examiner*—David W. Woodward
*Attorney, Agent, or Firm*—Charles R. Martin; William P. Heath, Jr.

[57] ABSTRACT

A process for preparing a polymer having repeating units corresponding to the structure

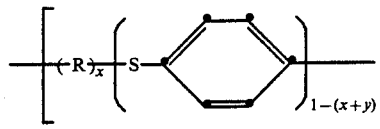

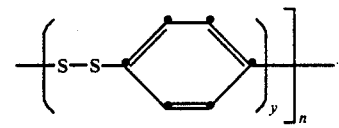

wherein R is

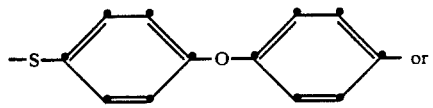 or

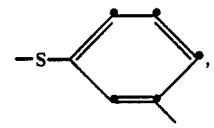

, y is in the range of 0.005 to 0.10, x is in the range of 0.01 to 0.50 when R is

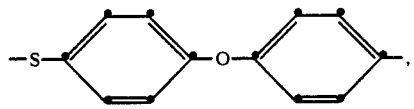

, x is in the range of 0.01 to 0.30 when R is

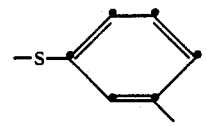

and n is at least 200. The polymer is prepared by reacting a diiodoaromatic compound and elemental sulfur.

2 Claims, No Drawings

COPOLY(PHENYLENE SULFIDE)

This is a continuation of application Ser. No. 07/382,457 filed on July 20, 1989, now abandoned, which is a continuation-in-part of Ser. No. 232,969, filed Aug. 17, 1988 now abandoned.

The invention relates to a copoly(phenylene sulfide) which contains diphenyl ether or meta phenylene units in the chain.

Copolymers of poly(phenylene sulfide) and other aromatic radicals are known in the art. Japanese Patent J6 1231-030-A discloses copolymers of PPS with 1 to 5 mol % of biphenylene or triphenylene units. Japanese Patent J6 1225-218-A disclosed a copolymer with sulfone groups which is said to be a block copolymer. Japanese Patent J6 1293-225-A discloses poly(phenylene sulfide) containing diphenyl ether units.

Copoly(phenylene sulfide) polymers prepared by heating a diiodoaromatic compound in the presence of elemental sulphur have been recently discovered and are disclosed in U.S. Pat. No. 4,786,713. These polymers can be described as corresponding to the structure

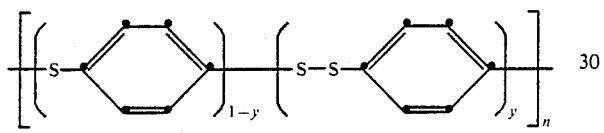

where y is in the range of 0.5 to 0.001.

We have now discovered that small amounts of either diphenyl ether or meta phenylene units can be incorporated into this polymer to produce a polymer which has increased toughness and can be crystallized. The diphenyl ether or meta phenylene units are incorporated into the polymer by using diiododiphenyl ether or meta diiodobenzene as a comonomer along with para diiodobenzene and sulfur.

Thus the polymer of this invention can be described as having repeating units corresponding to the structure

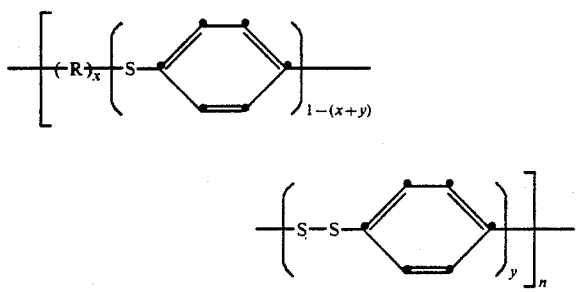

wherein R is

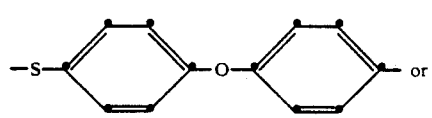 or

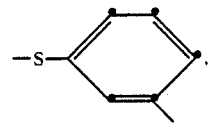

y is in the range of 0.005 to 0.10, x is in the range of 0.01 to 0.50 when R is

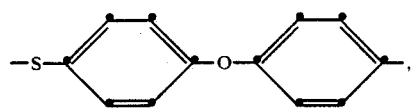

x is in the range of 0.01 to 0.30 when R is

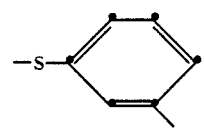

and n is at least 200.

Preferably x is in the range of 0.05 to 0.40 when R is

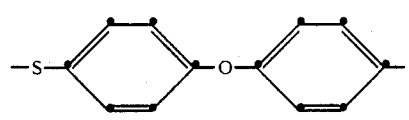

and x is preferably in the range of 0.01 to 0.20 when R is

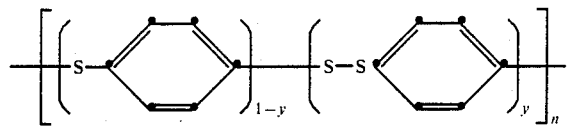

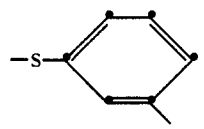

Preferably n is at least 400.

The copoly(phenylene sulfide) of this invention is prepared by reacting diiododiphenyl ether or meta diiodobenzene, para diiodobenzene and sulfur in the same manner as disclosed in U.S. Pat. No. 4,786,713 for the copoly(phenylene sulfide) not containing diphenylether units.

The diiodoaromatic starting materials of the present invention may be prepared by methods well known in the art, such as liquid- or gas-phase iodination reactions.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6–12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%-100%, although sulfur having a lower degree of purity may be used. This lack of sensitivity to the presence of impurities in the sulfur is advantageous to the present process when used as a commercial process since highly purified sulfur is not required and the associated expense is not incurred.

In the process used to prepare the polymer of this invention sulfur reacts with diiodobenzene and diiododiphenyl ether or meta diiodobenzene eliminating elemental iodine and forming the polymer.

The formation of polymer is not sensitive to the relative stoichiometry of the diiodoaromatic compounds and sulfur. Accordingly, an excess of sulfur or an excess of diiodoaromatic compounds may be used in the polymerization process. When excess sulfur is used, some disulfide linkages are observed in the polymer. Decreasing amounts of sulfur result in decreasing levels of disulfide linkages in the final polymer. When the diiodoaromatic compounds are present in excess, polymerization to high polymer can still occur, if the excess diiodoaromatic compounds are removed during final polymerization.

The polymerization reaction is preferably carried out in the absence of solvent by merely heating and reacting the sulfur and diiodoaromatic compounds. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

It is also possible to perform the polymerization reaction of the present invention by solid state polymerization. Solid state polymerization enables very high molecular weights and melt viscosities to be achieved. After an initial melt polymerization (or alternatively solution polymerization) has been performed, the product is cooled to a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the para diiodobenzene, diiododiphenyl ether or meta diiodobenzene and sulfur, elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the PAS and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°-400° C. will be suitable, although for particular diiodoaromatic compounds temperatures in excess of 400° C. may be used. Particularly preferred temperature ranges are from about 180°-350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however, agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The polymer of this invention is useful for preparation of various shaped articles such as pellets, fibers and molded articles. The polymer can be prepared into these shaped articles by conventional processes, such as injection molding, melt spinning, and melt extrusion.

EXAMPLES

Example 1

This examples illustrates the preparation of a polymer in accordance with this invention.

Into a 500-mL, 3-neck, round bottom flask are weighed the following: 32 g sulfur (0.998 mol), 328 g p-diiodobenzene (0.99 mol, 20 mol percent excess overall, 23.8 mol percent excess of this compound), 84.2 g p,p'-diiododiphenyl ether (0.20 mol, 20 mol percent copolymer units), and 0.8 g of 1,3-diiodo-5-nitrobenzene. The flask was fitted with a 350 mm long Vigreux column, a mechanical stirrer through the center joint, and an inlet tube for a slow air sweep (sweep rate 0.1 ft$^3$/hr). The column was attached via a distillation head and a takeoff tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 30 minutes and then reduced to 60 torr where it was held for an additional 30 minutes. The bath temperature was then increased to 250° C., the pressure reduced to 0.3 torr and the melt condensed for 1 hr. The bath temperature was raised to 300° C. and after 50 minutes the reaction flask was removed from the metal bath, repressurized with nitrogen, and allowed to cool under nitrogen. The polymer yield was determined by weighing the flask assembly after the reaction and subtracting that weight from the total weight of the assembly minus reactants prior to the start of the reaction. The yield was 102 percent of polymer with a high melt viscosity which partly crystallized upon cooling. DSC showed a first scan crystallization on heating of 164° C. (1.85 cal/g area) and a Tm of 244° C. (6.07 cal/g area) confirming the mostly crystallized nature of the cooled bulk polymer.

Example 2

This example illustrates the preparation of the polymer of this invention.

The preparation of Example 1 was repeated but using a different ratio of the two diiodoaromatic monomers. p-Diiodobenzene, 246 g (0.75 mol) and 168.4 g p,p'-diiododiphenyl ether (0.40 mol, 40 mol percent copolymer units) were employed in the preparation of the copolymer. The same heating and pressure schedule were employed as in Example 1. Polymer yield was 101.2 percent and the polymer was observed to be partly crystallized.

Example 3

This example illustrates the preparation of the polymer of this invention.

The preparation of Example 1 was repeated but using a different ratio of the two diiodoaromatic monomers. p-Diiodobenzene, 369 g (1.12 mol) and 42.1 g p,p'-diiododiphenyl ether (0.10 mol, 10 mol percent copolymer units) were employed in the preparation of the copolymer. The same heating and pressure schedule were employed as in Example 1 except that final condensation at 300° C. was done for only 33 minutes owing to very high melt viscosity. Polymer yield was 101.4 percent and the polymer was observed to be thoroughly crystallized. DSC showed no crystallization on heating in the first scan but a Tm at 255° C. (8.47 cal/g area) indicating its highly crystalline nature.

Example 4

This example illustrates the preparation of the polymer of this invention.

The preparation of Example 1 was repeated but using a different ratio of the two diiodoaromatic monomers. p-Diiodobenzene, 389.5 g (1.18 mol) and 21.0 g p,p'-diiododiphenyl ether (0.05 mol, 5 mol percent copolymer units) were employed in the preparation of the copolymer. The same heating and pressure schedule were employed as in Example 1 except that final condensation at 300° C. was done for only 36 minutes owing to very high melt viscosity. Polymer yield was 104.7 percent and the polymer was observed to be thoroughly crystallized. DSC showed no crystallization on heating in the first scan but a Tm at 268° C. (8.80 cal/g area) indicating its highly crystalline nature.

Example 5

This example illustrates the desirable crystallization characteristics of the polymer of this invention.

Samples of polymer from Examples 1 through 4 inclusive were granulated and pressed into films on a hydraulic press with top and bottom plattens heated to 300° C. Granules of the polymer were placed on 4 inch square ferrotype plates with a shim 0.020 inches thick covering the outer 0.25 inches of the plate area around each edge. The plate, shim, and granules were heated on the lower platten for 60 seconds, the top plate placed over the granules, and pressure applied for 30 seconds. After release of pressure, the assembly was quickly quenched in room temperature water until thoroughly cooled. The film was then removed and cut into ca 0.25 inch wide strips. The strips were held with pliers over a steam cone and after 60 to 120 seconds heating were mechanically stretched. For those films showing crystallization behavior upon stretching, the film narrowed to a certain width and then could not be stretched further. A center section of the thus oriented film was cut out and submitted for DSC scan. The results were as follows:

| Ex. | Mol % Diphenyl Ether | Pressed Film Tough? | Oriented Film DSC (1st Scan) | | | |
|---|---|---|---|---|---|---|
| | | | Tch. °C. | cal/g | Tm, °C. | cal/g |
| 1 | 5 | Yes | 108 | 3.83 | 272 | 11.80 |
| 2 | 10 | Yes | 112 | 3.46 | 268 | 9.09 |
| 3 | 20 | Yes | 119 | 4.25 | 246 | 8.51 |
| 4 | 40 | Yes | 128 | 0.73 | 216 | 1.46 |

These data show that all of the polymer of the invention developed crystallinity during the stretching process demonstrating that they could be used to prepare oriented fibers and films.

Example 6

This example illustrates the preparation of a polymer of this invention.

Examples 1-5 are repeated except an equvalent molar amount of meta diiodobenzene is used in place of p-p'-diiododiphenyl ether.

Similar results are achieved as in Examples 1-5 when p-p'-diiododiphenyl ether was used.

We claim:

1. A process for producing elemental iodine and a copoly(arylene sulfide) of repeating units corresponding to the structure

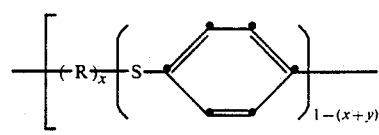

-continued

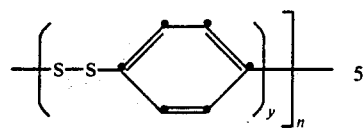

wherein R is

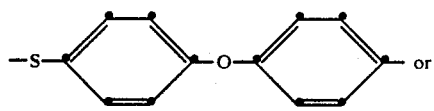

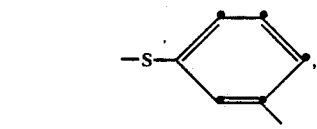

y is in the range of 0.005 to 0.10, x is in the range of 0.01 to 0.50 when R is

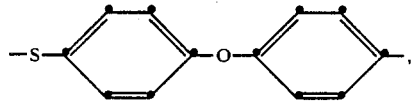

x is in the range of 0.01 to 0.30 when R is

and n is at least 200, consisting essentially of
(1) reacting at a temperature above about 175° C., a mixture of a diiodoaromatic compound and elemental sulfur to produce the elemental iodine and the copoly(arylene sulfide), and
(2) recovering the elemental iodine.

2. The process of claim 1 wherein x is in the range of 0.05 to 0.40 when R is

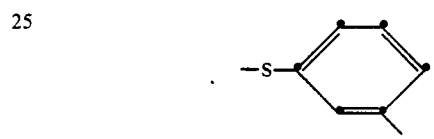

and x is in the range of 0.01 to 0.20 when R is

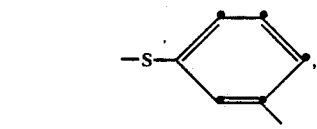

and n is at least 400.

* * * * *